United States Patent [19]

Roberts et al.

[11] Patent Number: 5,013,213
[45] Date of Patent: May 7, 1991

[54] AUTOMATIC DENESTING MACHINE

[75] Inventors: David J. Roberts, Hamburg; Ghandi Kadkoy, Montague, both of N.J.

[73] Assignee: KAR Enterprises, Inc., Hamburg, N.J.

[21] Appl. No.: 512,760

[22] Filed: Apr. 20, 1990

[51] Int. Cl.$^5$ .............................................. B65G 59/10
[52] U.S. Cl. .............................. 414/798.9; 414/795.6; 414/798.4; 414/798.5; 414/786; 198/409; 198/416
[58] Field of Search ............... 414/798.9, 798.4, 795.6, 414/796.4, 783, 754, 757, 798.5, 786; 198/375, 409, 416; 221/292, 293, 261

[56] References Cited

U.S. PATENT DOCUMENTS

| 4,054,212 | 10/1977 | Mueller | 414/798.9 X |
| 4,109,803 | 8/1978 | Quelch | 414/795.6 X |
| 4,343,391 | 8/1982 | Skyrpek et al. | 414/798.4 X |
| 4,718,534 | 1/1988 | Harper | 198/409 |

FOREIGN PATENT DOCUMENTS 0041357 3/1977 Japan .................................. 414/798.9

Primary Examiner—Frank E. Werner
Assistant Examiner—Brian Dinicola
Attorney, Agent, or Firm—Marmorek, Guttman & Rubenstein

[57] ABSTRACT

A machine for denesting stacked packaging baskets receives a stack of nested packaging baskets via a first conveyer belt. The stack of packaging baskets lies on its side. A gripper is reciprocatingly moved along a trajectory toward and away from the stack. During each reciprocating motion of the gripper, the first basket in the stack is gripped and removed by the gripper from the stack. The denested basket is then rotated into an upright position by engaging against a turning rod located above the trajectory of the gripper. The uprighted basket is then deposited on a second conveyer belt for transport to a location where product is added.

7 Claims, 4 Drawing Sheets

AUTOMATIC DENESTING MACHINE

FIELD OF THE INVENTION

The present invention relates to a machine for denesting packaging baskets, especially baskets used for the packaging of produce such as blueberries and strawberries.

BACKGROUND OF THE INVENTION

Packaging baskets for produce such as strawberries and blueberries are typically delivered to packaging houses from the manufacturer in nested stacks. The packaging house then must denest the baskets and fill the baskets with produce. While the present invention is described in connection with packaging baskets used for produce, it should be noted that the machine of the present invention may be used to denest other types of nested crates, packages and baskets.

Denesting of package baskets has proven to be a significant problem for packaging houses for a variety of reasons. Typically, the packaging baskets are made from a molded fibrous material, although styrofoam may also be used. Occasionally, when a molded fibrous material is used to form the baskets, the baskets are nested before the fibrous material is completely dry so that adjacent nested baskets in a stack stick together. In addition, because the baskets are made from relatively inexpensive materials, the packaging baskets are easily damaged during denesting. Furthermore, denesting has proven to be a time-consuming labor intensive process which is a significant source of overhead for the packaging house.

Typically, prior art denesting machines position the stack of baskets upside down and then utilize a vacuum suction or mechanical mechanism to separate the bottommost basket from the stack. The separated basket is then turned over so that it may be filled with produce.

Such prior art denesting machines have proven to be less than satisfactory for the packaging houses which utilize them. In particular, such prior art denesting machines have a small throughput, a small capacity so that they need to be constantly reloaded with packaging baskets, and tend to damage the packaging baskets upon denesting, especially when two packaging baskets are stuck together.

Accordingly, it is an object of the present invention to provide an improved machine for denesting packaging baskets. It is a further object of the invention to provide a denesting machine which has a high throughput, which requires little manual supervision and activity, and which does not damage the packaging baskets especially when they stick together.

SUMMARY OF THE INVENTION

In an illustrative embodiment, the present invention comprises a first conveyer belt system and a second conveyer belt system located downstream of and longitudinally aligned with the first conveyer belt system. Vertically, the second conveyer belt system is located at a lower height than the first conveyer belt system. A turning bar whose purpose is described below extends across the second conveyer belt system.

A stack of baskets to be denested is positioned on its side on the first conveyer belt system. The baskets advance on the first conveyer belt system towards a front end thereof until an end stop is reached. Illustratively, the stack of baskets is delivered onto the first conveyer belt system by an elevator system.

A robot system moves back and forth parallel to and above the second conveyer belt system. The robot system has a gripping device coupled thereto. The robot system and gripping device move back and forth above the second conveyer belt system but below the turning bar. During each cycle of the robot system, the gripping device moves towards the stack and grabs two oppositely disposed sides of the first basket in the stack and pinches the sides inward. The robot system then reverses direction and moves away from the stack to enable the gripped basket to move free of the stack and also move past the end stop. As the robot system moves away from the stack, the basket engages the turning bar, which as indicated above, is located above the trajectory of the robot system, and the denested basket is rotated so that the open top end of the basket is now facing upward. The gripping device then releases the basket and drops the basket onto the second conveyer belt system which is located below the robot system trajectory and turning bar. The robot system then reverses direction and moves toward the stack to denest the next basket, while the previously denested basket is transported by the second conveyer belt to a location where it is filled with product.

The inventive denesting machine has a very high basket throughput rate, requires little manual labor or supervision, and denests the baskets without damaging them, especially when baskets are stuck together.

DETAILED DESCRIPTION OF THE INVENTION

Turning to FIG. 1, FIG. 2, FIG. 3 and FIG. 4, an inventive denesting machine 10 is illustrated.

Figure 2:
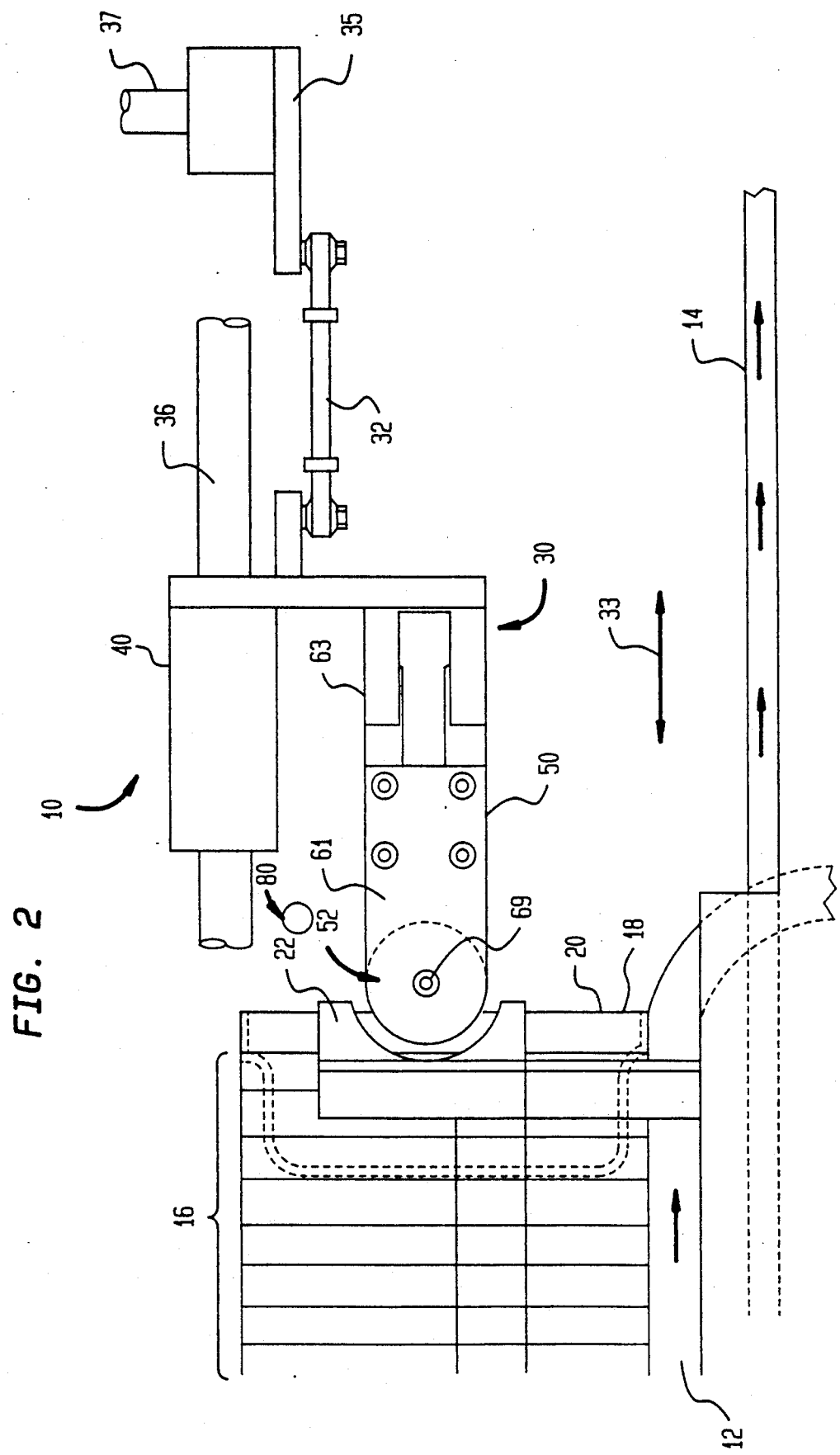
FIG. 2 shows a side view of the denesting machine of FIG. 1 when the gripping device is gripping a basket in a stack.
Figure 4:
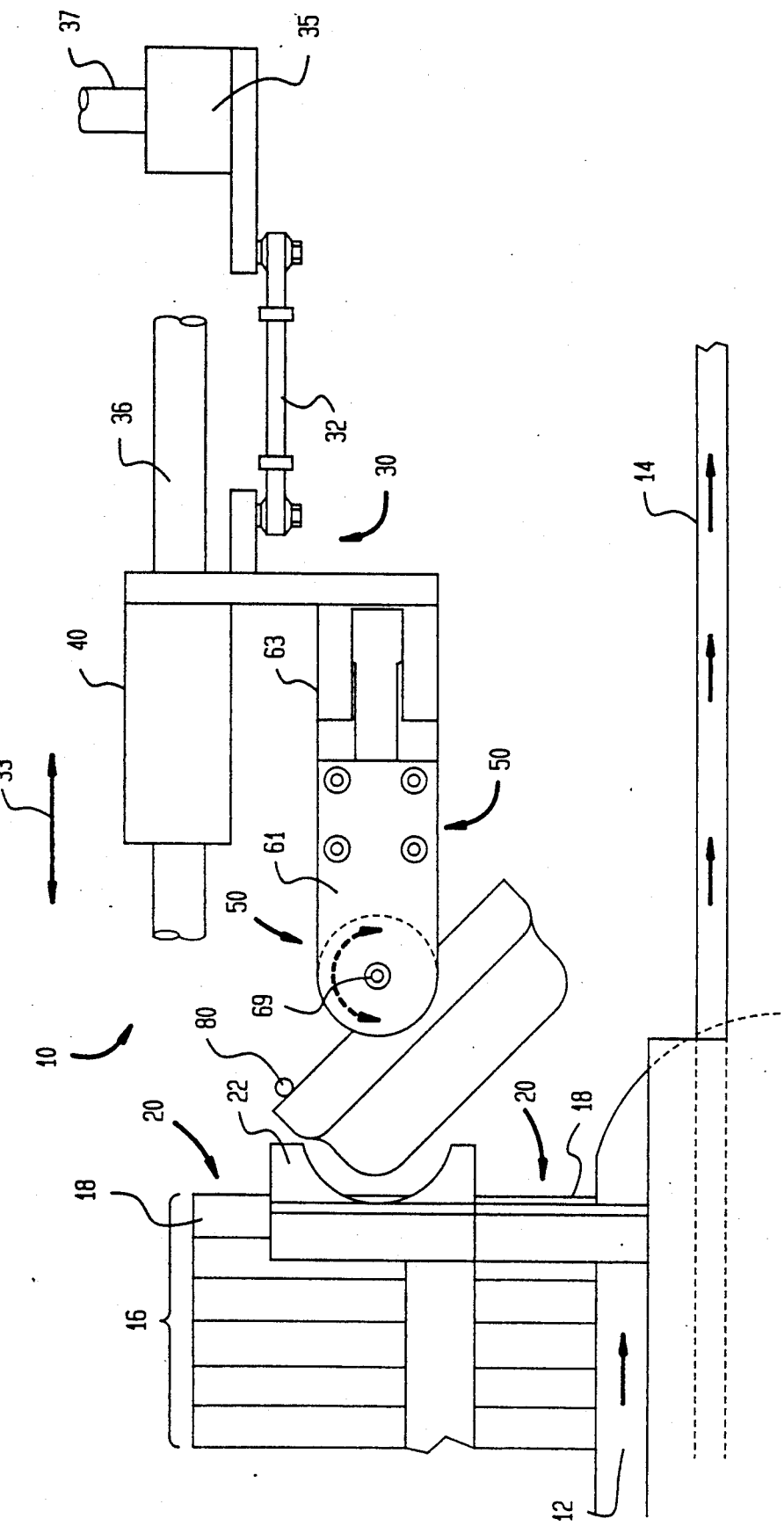
FIG. 4 shows a side view of the inventive denesting machine when a basket is being rotated.

The denesting machine 10 comprises two conveyer belts 12 and 14. The conveyer belt 14 is aligned parallel to the conveyer belt 12 and is located downstream of the conveyer belt 12. As shown in FIG. 2 and FIG. 4 the conveyer belt 14 is located at a lower height than the conveyer belt 12.

The conveyer belt 12 serves to transport a stack 16 of nested packaging baskets. The first basket in the stack 16 is designated by the numeral 18 and is shown in phantom extending into the stack 16 in FIG. 1 and FIG. 2. The stack 16 is transported on its side so that the open end 20 of the basket 18 faces towards the second conveyer belt system 14. The stack of baskets 16 is transported by the conveyer system 12 so that the first basket 18 reaches an end stop 22 shown in FIG. 1 and FIG. 3. The stack of nested baskets is delivered onto the first conveyer belt 12 by an elevator system not shown.

Figure 1:
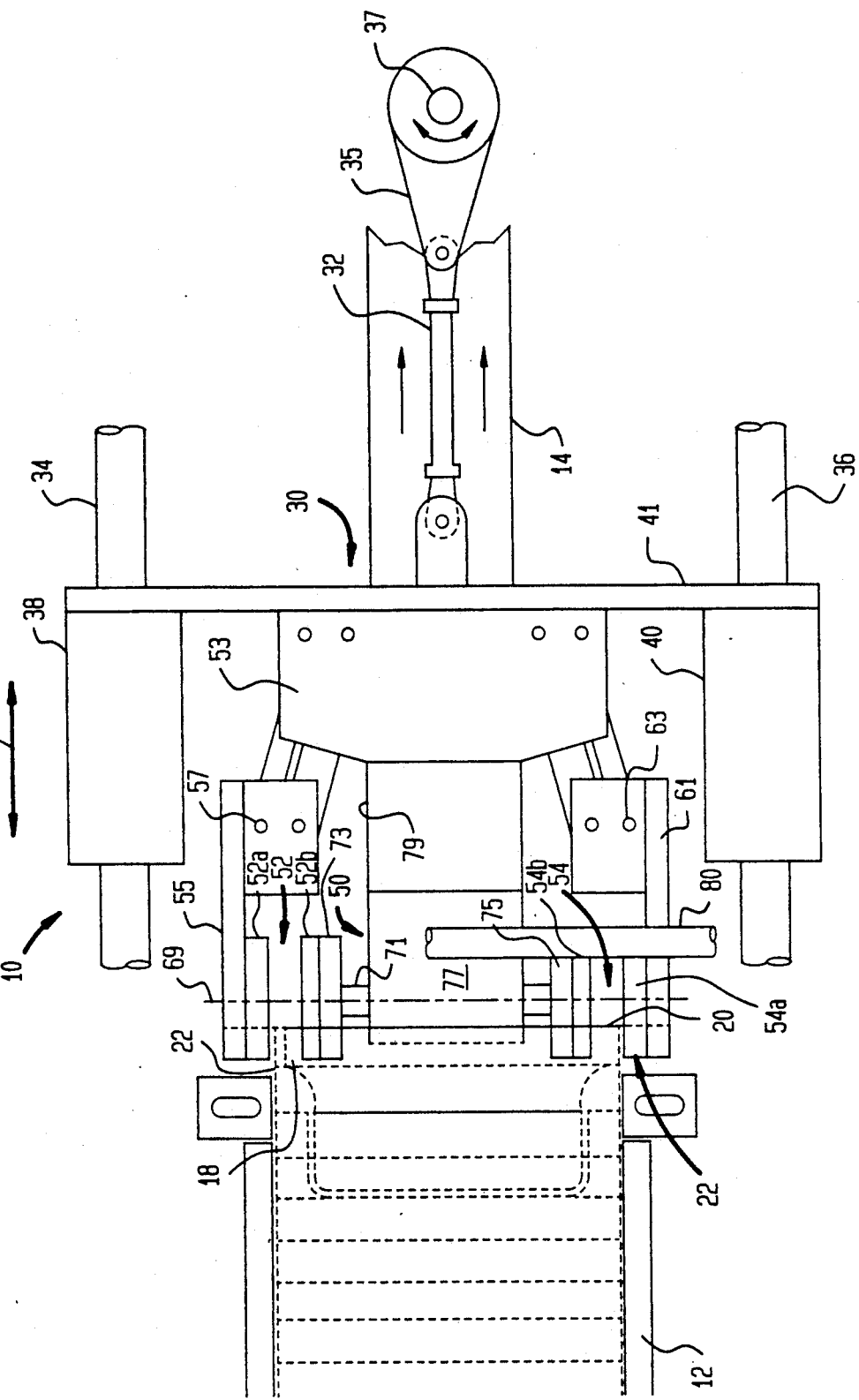
FIG. 1 shows a top view of a denesting machine in accordance with an illustrative embodiment of the present invention when a gripping device is gripping a basket in a stack.
Figure 3:
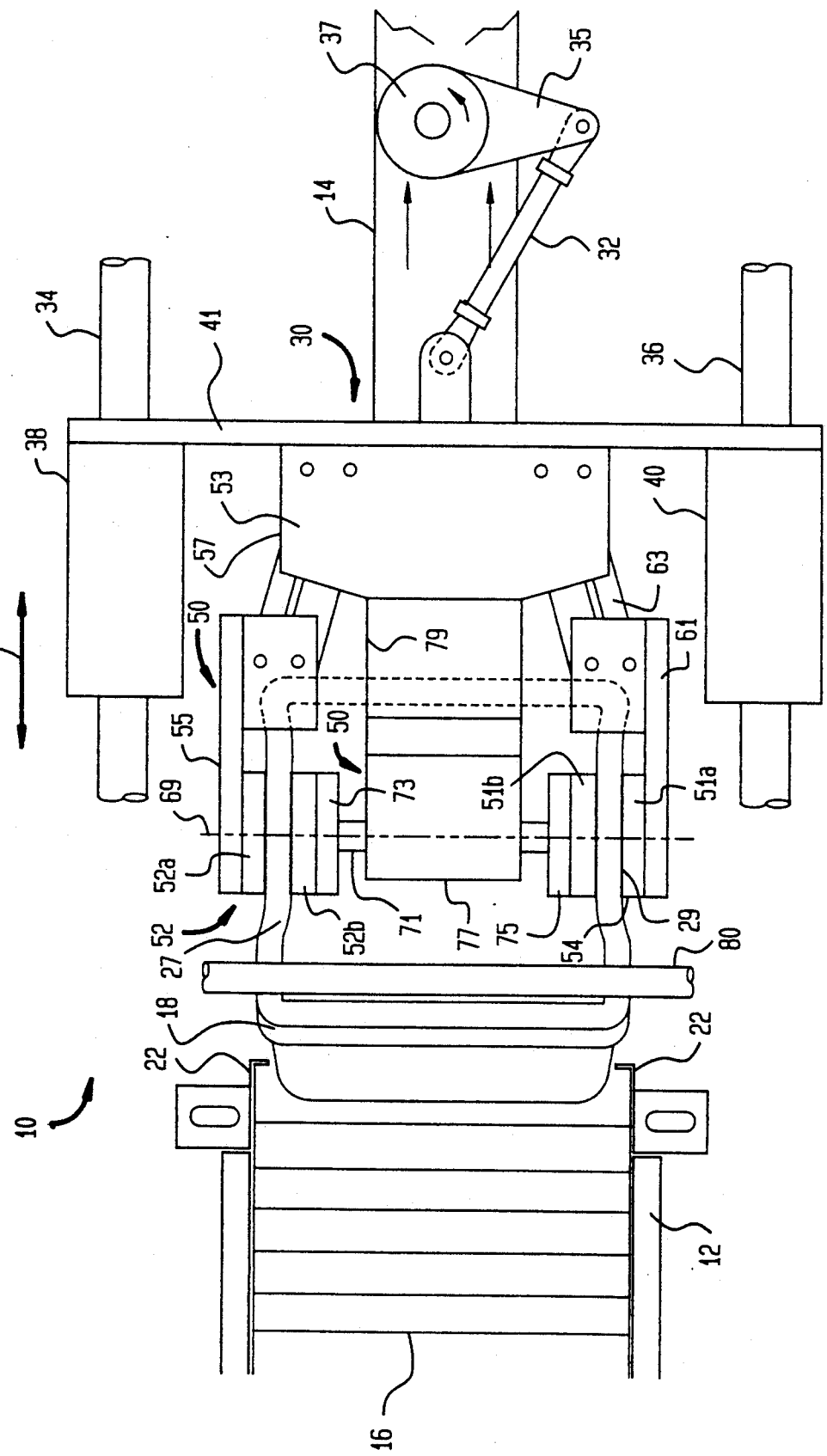
FIG. 3 shows a top view of the inventive denesting machine when a basket is being rotated.

Mounted above the second conveyer belt 14 is a robot system 30. The robot system 30 includes a tie rod arm 32 having an adjustable length which enables the robot system 30 to move back and forth in the direction of the arrow 33 parallel to and above the second conveyer belt 14. The arm 32 is connected to the rotatable cam 35 which rotates on the shaft 37 and is driven by a motor not shown. In FIGS. 1 and 2 the robot system 30 is in its most forward position near the stack of baskets 16. In FIGS. 3 and 4 the robot system 30 is retracted. The robot system 30 moves back and forth in the direction of the arrow 33 along the shafts 34 and 36 through use of the linear ball bearings 38 and 40, which linear ball bearings are connected by the rigid bar 41.

As shown in FIG. 1 and FIG. 3, the robot system 30 includes the gripping device 50. The gripping device 50 includes two sets of jaws 52 and 54. The jaws 52 includes the outer jaw member 52a and the inner jaw member 52b. The outer jaw member 52a is connected to the robot base 53 via the arm 55 which is fastened at the joint 57. Similarly, the jaws 54 includes the outer jaw member 54a and the inner jaw member 54b. The outer jaw member 54a is connected to the robot base 53 via the arm 61 which is fastened at the joint 63. The jaw members 52a, 52b, 54a, 54b are all rotatable about a common axis 69. The outer jaw elements can move towards and away from the corresponding inner jaw elements.

The inner jaw elements 52b and 54b are interconnected by a shaft 71 to which the end pieces 73 and 75 are attached. The shaft 71 can slide within the hollow tube 77 which is attached to the robot base 53 via the arm 79.

When the robot system 30 is in its forwardmost position as shown in FIGS. 1 and 2, the gripping device grips, operating under electronic control, oppositely disposed sides 27 and 29 (see FIG. 3) of the front basket 18 by positioning two oppositely disposed sides inbetween the jaw elements 52a, 52b and 54a, 54b and by moving the outer jaw elements 52a and 54a towards the corresponding inner jaw elements 52b, 54b. The inner jaw elements are coupled to the shaft 71 and are then free to move laterally to compensate for differences in thickness of the oppositely disposed sides of the basket. In particular, the outer jaw elements 52a and 54a, press the basket sides inward toward the inner jaw elements 52b, 54b. When the adjustable tie rod arm 32 moves the robot system backwards, this permits the gripped basket to move outward from the stack beyond the end stop 22.

FIGS. 3 (top view) and 4 (side view) show the movement of the denested basket 18 as it moved by the robot system 30.

As the denested basket 18 is moved it engages the rod 80 which extends across the conveyer belt 14 at a height above the trajectory of the robot system 30. The rod 80 provides for a rotation of the denested basket. In particular, the rod rotates the basket in cooperation with the rotatable jaw elements 52a, 52b and 54a, 54b. Illustratively, the denested basket 18 rotates, for example, 45 to 60 degrees. The gripping device 50 than releases the basket so that it is deposited on the second conveyer belt 14 right side up and is then transported to a location where it is filled with produce.

Thus, operation of the inventive denesting machine may be described as follows. The cam 35 rotates back and forth around the shaft 37 pushing the robot system 30 back and forth on a longitudinal trajectory above the second conveyer belt system 14. In each cycle of the robot system, gripping device 50 attached to the robot system grips the front basket in the stack 16 delivered by the first conveyer belt system 12. The stack of baskets is delivered laying on its side by the first conveyer system. The gripping device grips the first basket in the stack and denests this basket. As the robot system moves back from the stack, the denested basket is rotated by engaging the basket with a rod 80 which extends across the second conveyer belt above the trajectory of the robot system. The basket is then deposited right side up on the second conveyer system 14. The robot system then moves back towards the stack to grip another basket. The rotation of the basket by engagement with the rod 80 is clearly shown in FIGS. 3 and 4.

The denesting machine of the present invention offers significant advantages in comparison with prior art denesting machines and in comparison to manual denesting. First the denested baskets are placed precisely on the second conveyer belt to be filled with product. In addition, the inventive machine requires little manual supervision or labor. It is not necessary to count inputted nested baskets. Instead, it is only necessary to continuously feed the stack on the first conveyer. Since this can be done automatically using an elevator system, one person can supervise many machines. The inventive machine has a very high basket throughput rate and can separate baskets without damaging them even when two baskets are stuck together.

Finally, the above-described embodiments of the invention are intended to be illustrative only. Numerous alternative embodiments may be devised by those skilled in the art without departing from the spirit and scope of the following claims.

We claim:

1. A machine for denesting packaging baskets comprising
    first conveying means for delivering a sideways laying stack of nested packaging baskets to a front end of said first conveying means,
    second conveying means located downstream of the front end of said first conveying means for receiving denested baskets from said stack,
    gripper means for gripping said baskets in said stack,
    reciprocating means for moving said gripper means in a reciprocating movement towards and away from the front end of the first conveying means along a trajectory above said second conveying means to enable said gripper means to grip the frontmost basket from said stack and to denest the frontmost basket from the stack by moving said frontmost basket away from the stack, and
    rotating means for rotating said denested basket when said reciprocating means causes said denested basket to move away from said stack to upright the denested basket, so that the denested basket is deposited wherein said rotating means comprise a rod mounted across said conveying means at a height above the trajectory of said reciprocating means on said second conveying means in an upright position.

2. The machine of claim 1 wherein said first conveying means comprises a first conveyer belt.

3. The machine of claim 1 wherein said second conveying means comprises a second conveyer belt.

4. The machine of claim 1 wherein said gripper means comprises a pair of jaws, each of said jaws comprising an inner and an outer jaw element, said jaw elements being rotatable about a common axis to aid in the rotating of said denested basket.

5. The machine of claim 1 wherein said reciprocating means comprises a robot system connected by an arm to a reciprocating cam.

6. A method for denesting packaging baskets from a stack of packaging baskets comprising the steps of
   receiving a stack of nested packaging baskets via a first conveying means, said stack of packaging baskets laying on its side,
   reciprocatingly moving a gripper back and forth along a trajectory toward and away from said stack,
   during each reciprocating motion of said gripper, gripping the first basket in said stack and removing the first basket from said stack, rotating said gripped basket so the basket is upright by engaging said basket against a rod located above and transverse to the trajectory of the gripper, and depositing the uprighted basket on a second conveying means located below the trajectory of the gripper.

7. A machine for denesting a stack of packaging baskets comprising:
   means for receiving a stack of nested packaging baskets, said stack of packaging baskets laying on its side,
   a gripper for gripping the baskets forming said stack,
   means for reciprocatingly moving said gripper back and forth towards and away from said stack of packaging baskets so that during each reciprocating motion of said gripper, said gripper grips the first basket in said stack and removes the first basket from said stack,
   a turning bar located above said gripper for engaging each basket as it is removed by said gripper from the stack and for rotating each basket so that it is upright, and
   conveying means for receiving and transporting the uprighted baskets.

* * * * *